(12) United States Patent
Nishida (10) Patent No.: US 9,599,068 B2
(45) Date of Patent: Mar. 21, 2017

(54) MULTI-CYLINDER INTERNAL COMBUSTION ENGINE

(71) Applicant: TOYOTA JIDOSHA KABUSHIKI KAISHA, Toyota-shi, Aichi-ken (JP)

(72) Inventor: Kentaro Nishida, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/777,804

(22) PCT Filed: Apr. 25, 2013

(86) PCT No.: PCT/JP2013/062279
§ 371 (c)(1),
(2) Date: Sep. 17, 2015

(87) PCT Pub. No.: WO2014/174645
PCT Pub. Date: Oct. 30, 2014

(65) Prior Publication Data
US 2016/0131087 A1    May 12, 2016

(51) Int. Cl.
*F02M 25/07* (2006.01)
*F02M 25/028* (2006.01)
(Continued)

(52) U.S. Cl.
CPC ............ *F02M 25/028* (2013.01); *F01L 1/34* (2013.01); *F02B 75/18* (2013.01);
(Continued)

(58) Field of Classification Search
CPC ...... F02M 25/028; F02M 26/30; F02M 26/35; F02M 26/23; F02D 13/0215;
(Continued)

(56) References Cited

U.S. PATENT DOCUMENTS

| 6,161,521 | A | * | 12/2000 | Russ | .................. | F01L 1/34 |
| | | | | | | 123/324 |
| 2001/0050067 | A1 | * | 12/2001 | Sato | .................. | F01L 1/34 |
| | | | | | | 123/90.17 |
| 2009/0107430 | A1 | * | 4/2009 | Daigo | .................. | F01L 1/181 |
| | | | | | | 123/90.15 |

FOREIGN PATENT DOCUMENTS

| JP | 10-318049 | 12/1998 |
| JP | 2003-201922 | 7/2003 |

* cited by examiner

*Primary Examiner* — Hung Q Nguyen
(74) *Attorney, Agent, or Firm* — Finnegan, Henderson, Farabow, Garrett & Dunner, LLP (57) ABSTRACT

A multi-cylinder internal combustion engine (1) having four cylinders is provided with an EGR device (3) including an EGR cooler (27). The multi-cylinder internal combustion engine has: four exhaust side branch conduits (15) each being provided to each cylinder (2); a storage tank (31) which stores condensed water (CW) generated by the EGR cooler (27); and four condensed water introduction conduits (33) each being provided to each exhaust side branch conduit (15) and being communicated with the exhaust side branch conduit (15) and the storage tank (31). When the wall temperature of the cylinders (2) in the decelerating operation is equal to or more than a predetermined temperature, an exhaust-side variable valve mechanism (23B) and an intake-side variable valve mechanism (23A) are controlled respectively so that the valve closing timing of an exhaust valve (21) is retarded, and the valve opening timing of an intake valve (20) is retarded.

7 Claims, 8 Drawing Sheets

(51) Int. Cl.
  *F01L 1/34* (2006.01)
  *F02D 13/02* (2006.01)
  *F02B 75/18* (2006.01)
  *F01L 9/02* (2006.01)
  *F01L 1/053* (2006.01)

(52) U.S. Cl.
  CPC ..... *F02D 13/0215* (2013.01); *F02D 13/0261* (2013.01); *F02M 26/23* (2016.02); *F02M 26/30* (2016.02); *F02M 26/35* (2016.02); *F01L 9/026* (2013.01); *F01L 2001/0537* (2013.01); *F02B 2075/1816* (2013.01); *Y02T 10/121* (2013.01); *Y02T 10/18* (2013.01)

(58) Field of Classification Search
  CPC .................. F02D 13/0261; F02B 75/18; F02B 2075/1816; F01L 1/34; F01L 9/026; F01L 2001/0537; Y02T 10/121; Y02T 10/18
  See application file for complete search history.

MULTI-CYLINDER INTERNAL COMBUSTION ENGINE

CROSS-REFERENCE TO RELATED APPLICATIONS

This application is a national phase application of International Application No. PCT/JP2013/062279, filed Apr. 25, 2013, the content of which is incorporated herein by reference.

TECHNICAL FIELD

The present invention relates to a multi-cylinder internal combustion engine that is equipped with an EGR device.

BACKGROUND ART

An internal combustion engine is per se known in which condensed water generated by the EGR cooler is stored, and this stored condensed water is injected into the intake passage (refer to Patent Document #1). Apart from the above, it may be considered that Patent Document #2 in the Citation List below may have some relevance to the present invention.

CITATION LIST

Patent Literature

Patent Document #1: JP1998-318049A.
Patent Document #2: JP2003-201922A.

SUMMARY OF INVENTION

Technical Problem

With the internal combustion engine of Patent Document #1, along with an intake air, the condensed water that has been injected into the intake passage being supplied into the cylinders, the combustion temperature is kept down by this condensed water that has been supplied into the cylinders being vaporized. However, since the condensed water is acidic, if the condensed water remains at time of engine stop in a condensed water storage portion, where the condensed water is stored, which could lead corrosion of the pump. Accordingly, it is preferred that the condensed water is not stored in the condensed water storage portion as much as possible at time of engine stop.

Then, the object of the present invention is to provide a multi-cylinder internal combustion engine that is capable of decreasing a remaining amount of the condensed water in the condensed water storage portion at time of engine stop.

Solution to Problem

A multi-cylinder internal combustion engine as one aspect of the present invention is a multi-cylinder internal combustion engine having: a plurality of cylinders; and an EGR device including an EGR cooler, wherein the multi-cylinder internal combustion engine comprising: a plurality of exhaust side branch conduits, each of the plurality of exhaust side branch conduits being provided to each of the plurality of cylinders; a condensed water storage portion where condensed water generated by the EGR cooler is stored; a plurality of condensed water introduction conduits, each of the plurality of condensed water introduction conduits being provided for each exhaust side branch conduit, and is communicated with a corresponding exhaust side branch conduit and with the condensed water storage portion, an exhaust-side variable valve mechanism being allowed to change valve timing of each exhaust valve; and a valve timing control device being configured to control the exhaust-side variable valve mechanism so that a valve closing timing of the exhaust valve is retarded when wall temperature of the cylinders is equal to or higher than a predetermined temperature in an ongoing decelerating operation.

According to the above multi-cylinder internal combustion engine, the exhaust side branch conduit provided for each cylinder and the condensed water storage portion are communicated with each other through the condensed water introduction conduit. Due to this, when the intake stroke of one cylinder and the exhaust stroke of the other cylinder overlap with each other, the exhaust gas pulsation which is generated by the exhaust stroke of the other cylinder increases a pressure in the condensed water storage portion through the condensed water introduction conduit. Thereby, the condensed water stored in the condensed water storage portion is supplied to the corresponding exhaust side branch conduit and the corresponding cylinder through the condensed water introduction conduit in the valve overlap period. Further, as the wall temperature of cylinders is higher, the evaporation of the condensed water is more prompted. Accordingly, as the wall temperature is higher, more condensed water can be processed in a short time. In this multi-cylinder internal combustion engine, since the valve closing timing of each exhaust valve is retarded when the wall temperature is equal to or higher than the predetermined temperature in the ongoing decelerating operation, the negative pressure occurring inside an area from the corresponding exhaust side branch conduit to the corresponding cylinder is increased. Thereby, more condensed water can be taken into the cylinder than condensed water of a case where the mentioned valve timings are not retarded, and thereby, it is possible to process much amount of condensed water in the ongoing decelerating operation. Accordingly, since the process of the condensed water is promoted in the ongoing decelerating operation, it is possible to decrease the amount of condensed water remaining in the condensed water storage portion at the moment when the engine 1 stops following after the decelerating operation. Therefore, it is possible to avoid the corrosion of the condensed water storage portion.

As one embodiment of the multi-cylinder internal combustion engine of the present invention, the valve timing control device may be configured to control the exhaust-side variable valve mechanism so that the valve closing timing of the exhaust valve is retarded when engine rotational speed is equal to or lower than a predetermined rotational speed and also the wall temperature of the cylinders is equal to or higher than the predetermined temperature, in the ongoing decelerating operation. Further, the valve timing control device may be configured to control the exhaust-side variable valve mechanism so that the valve closing timing of the exhaust valve is retarded when a pondage of condensed water stored in the condensed water storage portion is equal to or more than a predetermined pondage and also the wall temperature of the cylinders is equal to or higher than the predetermined temperature, in the ongoing decelerating operation. According to the above embodiments, a frequency of change of the valve timing is lowered as compared to a case where the valve closing timing of the exhaust valve is retarded in the ongoing decelerating operations without exception. Thereby, while the negative effects of the change of the valve timing, such as deterioration of output of the multi-cylinder internal combustion engine and deterioration of fuel cost, are reduced as much as possible, enabled is the process of the condensed water so that the condensed water does not remain in the condensed water storage portion at time of engine stop following after the decelerating operation.

As one embodiment of the multi-cylinder internal combustion engine of the present invention, the multi-cylinder internal combustion engine may further comprise an intake-side variable valve mechanism being allowed to change valve timing of each intake valve, and the valve timing control device may be configured to control each of the exhaust-side variable valve mechanism and the intake-side variable valve mechanism so that the valve closing timing of the exhaust valve is retarded and also a valve opening timing of the intake valve is retarded, when the wall temperature is equal to or higher than the predetermined temperature in the ongoing decelerating operation. According to this embodiment, the valve opening timing of the intake valve is retarded in time with the retard of the valve closing timing of the exhaust valve. Due to this, it is possible to make the negative pressure occurring inside area from the corresponding exhaust side branch conduit to the corresponding cylinder further higher. Thereby, the process of the condensed water in the ongoing decelerating operation is further promoted.

In the embodiment, the valve timing control device may be configured to control each of the exhaust-side variable valve mechanism and the intake-side variable valve mechanism so that the valve closing timing of the exhaust valve is retarded and also the valve opening timing of the intake valve is retarded, when engine rotational speed is equal to or lower than a predetermined rotational speed and also the wall temperature of the cylinders is equal to or higher than the predetermined temperature, in the ongoing decelerating operation. Further, the valve timing control device may be configured to control each of the exhaust-side variable valve mechanism and the intake-side variable valve mechanism so that the valve closing timing of the exhaust valve is retarded and also the valve opening timing of the intake valve is retarded, when a pondage of condensed water stored in the condensed water storage portion is equal to or more than a predetermined pondage and also the wall temperature of the cylinders is equal to or higher than the predetermined temperature, in the ongoing decelerating operation. According to the above embodiments, a frequency of change of the valve timing is lowered as compared to a case where the valve closing timing of the exhaust valve and the valve opening timing of the intake valve are retarded in the ongoing decelerating operations without exception. Thereby, while the negative effects of the change of the valve timing, such as deterioration of output of the multi-cylinder internal combustion engine and deterioration of fuel cost, are reduced as much as possible, enabled is the process of the condensed water so that the condensed water does not remain in the condensed water storage portion at time of engine stop following after the decelerating operation.

As one embodiment of the multi-cylinder internal combustion engine, the valve timing control device may be configured to control the exhaust-side variable valve mechanism so that duration of a valve overlap period where valve open periods of the exhaust valve and the intake valve overlap with each other becomes zero, when the wall temperature is less than the predetermined temperature in the ongoing decelerating operation. Under a situation where it is not expected to promote the process of the condensed water because the wall temperature of the cylinders is low, when the condensed water is taken into the cylinder, the condensed water might remain in the cylinder even during engine stop, which could make corrosion of the inside of the cylinder. According to this embodiment, when the wall temperature of the cylinders is less than the predetermined temperature in the ongoing decelerating operation, since the duration of the overlap period becomes zero, it is prohibited to take the condensed water into the cylinder. Thereby, since the amount of condensed water remaining in the cylinder, it is possible to suppress the corrosion in the cylinders.

DESCRIPTION OF EMBODIMENTS

First Embodiment

Figure 1:
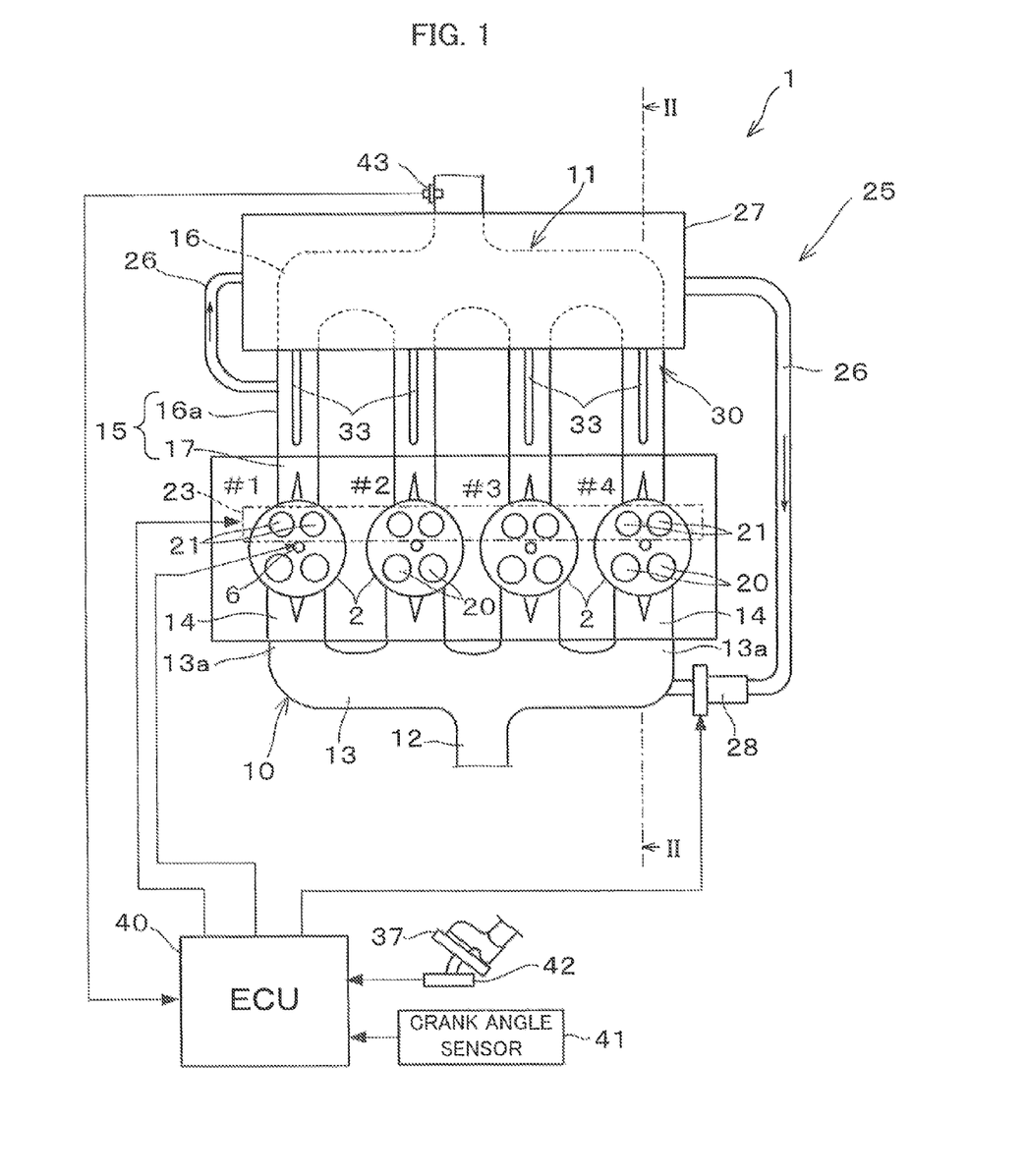
FIG. 1 is a diagram schematically showing a multi-cylinder internal combustion engine according to an embodiment of the present invention in its state as seen vertically from above.
Figure 2:
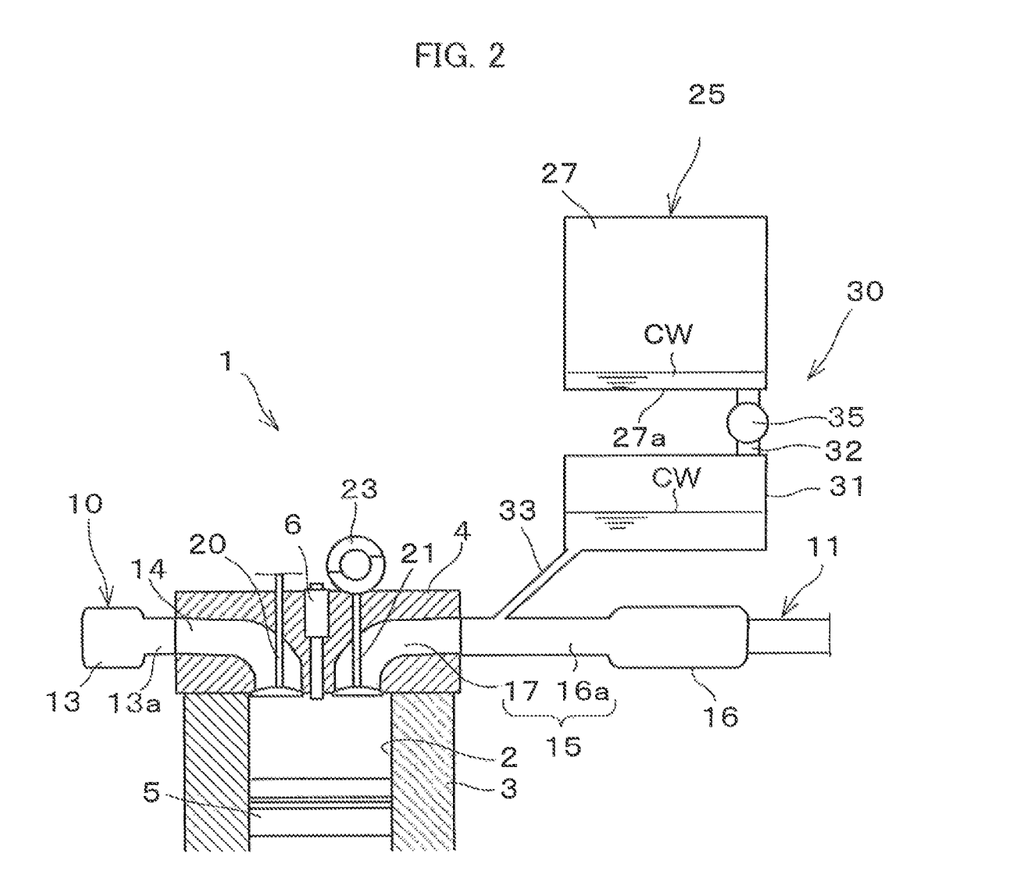
FIG. 2 is a sectional view taken along lines II-II in FIG. 1.
Figure 3:
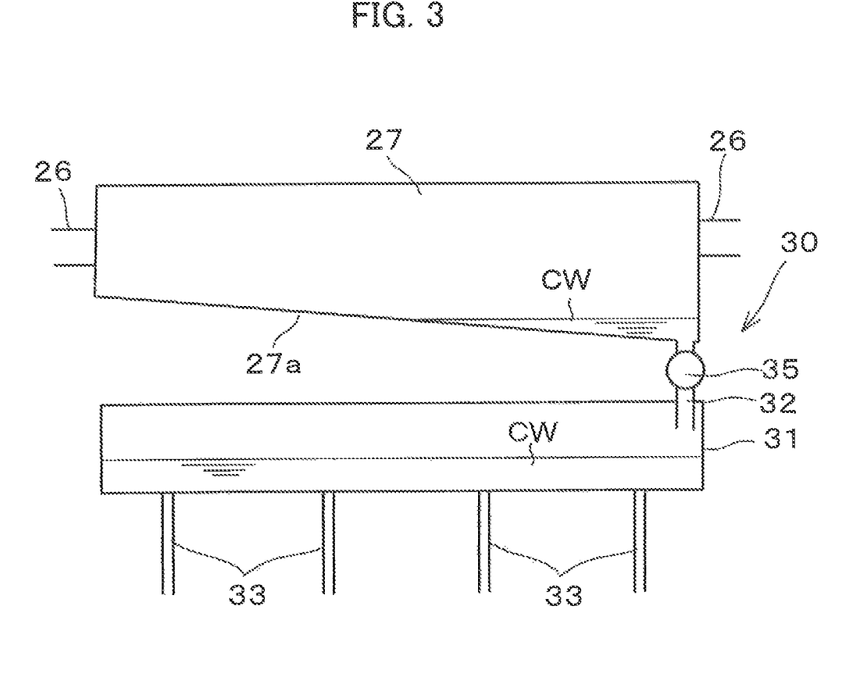
FIG. 3 is a figure showing the situation as seen from the direction of the arrow sign III in FIG. 1.

As shown in FIG. 1 to FIG. 3, a multi-cylinder internal combustion engine 1 (hereinafter termed the "engine") is built as a four-cylinder type in line diesel engine in which four cylinders 2 are arranged along a straight line. This engine 1 is, for example, mounted as a power source for an automobile. The engine 1 comprises a cylinder block 3 in which the cylinders 2 are formed, and a cylinder head 4 that is attached to the cylinder block 3 so as to close the upper openings of the cylinders 2. Pistons 5 are inserted into the cylinders 2 and reciprocate freely therein. In order to supply fuel into the cylinders 2, each of the cylinders 2 is provided with a fuel injector 6, which is fitted to its cylinder so that its end is exposed in the ceiling portion thereof. Fuel is supplied under pressure to these fuel injectors 6 via a common rail not shown in the figures.

An intake passage 10 and an exhaust passage 11 are connected to the cylinders 2. Air conducted through the intake passage 10 is charged into each of the cylinders 2 in order. When the cylinders are numbered as #1, #2, #3, and #4 in order from the left to the right in FIG. 1, the combustion sequence of this engine 1 is set to #1→#3→#4→#2. Fuel injected into the cylinders 2 from the fuel injectors 6 is self-ignited in their compression strokes according to this combustion sequence. And the exhaust gas after combustion is conducted to the exhaust passage 11, with this exhaust gas conducted to the exhaust passage 11 being emitted to the atmosphere after having been purified by an exhaust gas purification device not shown in the figures.

The intake passage 10 comprises an intake conduit 12 into which air is conducted after having been filtered by an air filter not shown in the figures, an intake manifold 13 that distributes this air conducted into the intake conduit 12 to the cylinders 2, and intake ports 14 that are connected to branch conduits 13a into which the intake manifold 13 branches and that are formed in the cylinder head 4 so as to lead to the cylinders 2. The exhaust passage 11 comprises four exhaust side branch conduits 15 one of which is provided for each of the cylinders 2, and an exhaust manifold 16 into which these exhaust side branch conduits 15 converge. Each of the exhaust side branch conduits 15 comprises an exhaust port 17 that is formed in the cylinder head 4 so as to lead to one of the cylinders 2, and a branch conduit 16a of the exhaust manifold 16 that is connected to that exhaust port 17.

Each of the intake ports 14 for a single cylinder 2 branches into two, and these two branch portions open into the cylinder 2. These opening portions of the intake port 14 are opened and closed by intake valves 20, two of which are provided for each cylinder 2. In a similar manner, each of the exhaust ports 17 for a single cylinder 2 branches into two, and these two branch portions open into the cylinder 2. These opening portions of the exhaust port 17 are opened and closed by exhaust valves 21, two of which are provided for each cylinder 2. Each of the intake valves 20 are driven to open and close by an intake-side variable valve mechanism 23A, and each of the exhaust valves 21 is driven to open and close by an exhaust-side variable valve mechanism 23B. The intake-side variable valve mechanism 23A and the exhaust-side variable valve mechanism 23B are well-known mechanisms which are capable of changing continuously valve operating characteristics, such as valve timings including valve opening timing, valve closing timing and the like, and valve lifts, with respect to the intake valves 20 and the exhaust valves 21 respectively.

As shown in FIG. 1, an EGR device 25 is provided to the engine 1 and implements EGR (Exhaust Gas Recirculation) in which a portion of the exhaust gas is recirculated into the intake system, in order to reduce nitrogen oxides (NOx) and enhance fuel consumption. This EGR device 25 comprises an EGR passage 26 that connects the exhaust passage 11 to the intake passage 10, an EGR cooler 27 that cools the exhaust gas in this EGR passage 26, and an EGR valve 28 for adjusting the flow rate of exhaust gas (i.e. of EGR gas) conducted to the intake passage 10. The end portion of this EGR passage 26 on the exhaust gas side opens to the exhaust side branch conduit 15 of the #1 cylinder 2, while its end portion on the intake side opens to the intake manifold 13. As is per se known, the EGR cooler 27 is a device that utilizes the cooling water of the engine 1 as a coolant, and that lowers the temperature of the exhaust gas (i.e. of the EGR gas) by performing heat exchange between this coolant and the hot exhaust gas. Due to the temperature of the EGR gas dropping in this way, moisture included in the EGR gas condenses, and accordingly condensed water is generated within the EGR cooler 27.

As shown in FIG. 2 and FIG. 3, a condensed water processing device 30 is provided to the engine 1 in order to perform processing and retrieving of the condensed water CW generated by the EGR cooler 27. This condensed water processing device 30 comprises a storage tank 31 that stores the condensed water CW as the condensed water accumulation portion, a connecting pipe 32 that connects the EGR cooler 27 to the storage tank 31, and four condensed water introduction conduits 33 for introducing the condensed water CW in the storage tank 31 to the four exhaust side branch conduits 15. One of these condensed water introduction conduits 33 is provided for each of the exhaust side branch conduits 15, so that each of these condensed, water introduction conduits 33 is communicated with its corresponding exhaust side branch conduit 15 and with the storage tank 31.

In order for it to be possible for the condensed water CW generated by the EGR cooler 27 to be efficiently retrieved to the storage tank 31, the EGR cooler 27 is disposed so that its bottom portion 27a is inclined with respect to the horizontal direction, and moreover the opening portion of the connecting pipe 32 is provided at the lowermost portion of the bottom portion 27a of the EGR cooler 27. Furthermore, the EGR cooler 27 and the storage tank 31 are disposed vertically above the exhaust side branch conduits 15. Due to this, the introduction of the condensed water CW into the exhaust side branch conduits 15 becomes simple and easy, since it is possible to take advantage of gravity to perform this introduction. It should be understood that, in order to prevent exhaust gas from flowing backward through the condensed water introduction conduits 33 into the EGR cooler 27, a non-return valve 35 is provided to the connection pipe 32. The non-return valve 35 prevents flow of fluid from the storage tank 31 toward the EGR cooler 27, while permitting flow of fluid in the opposite direction.

Figure 4:
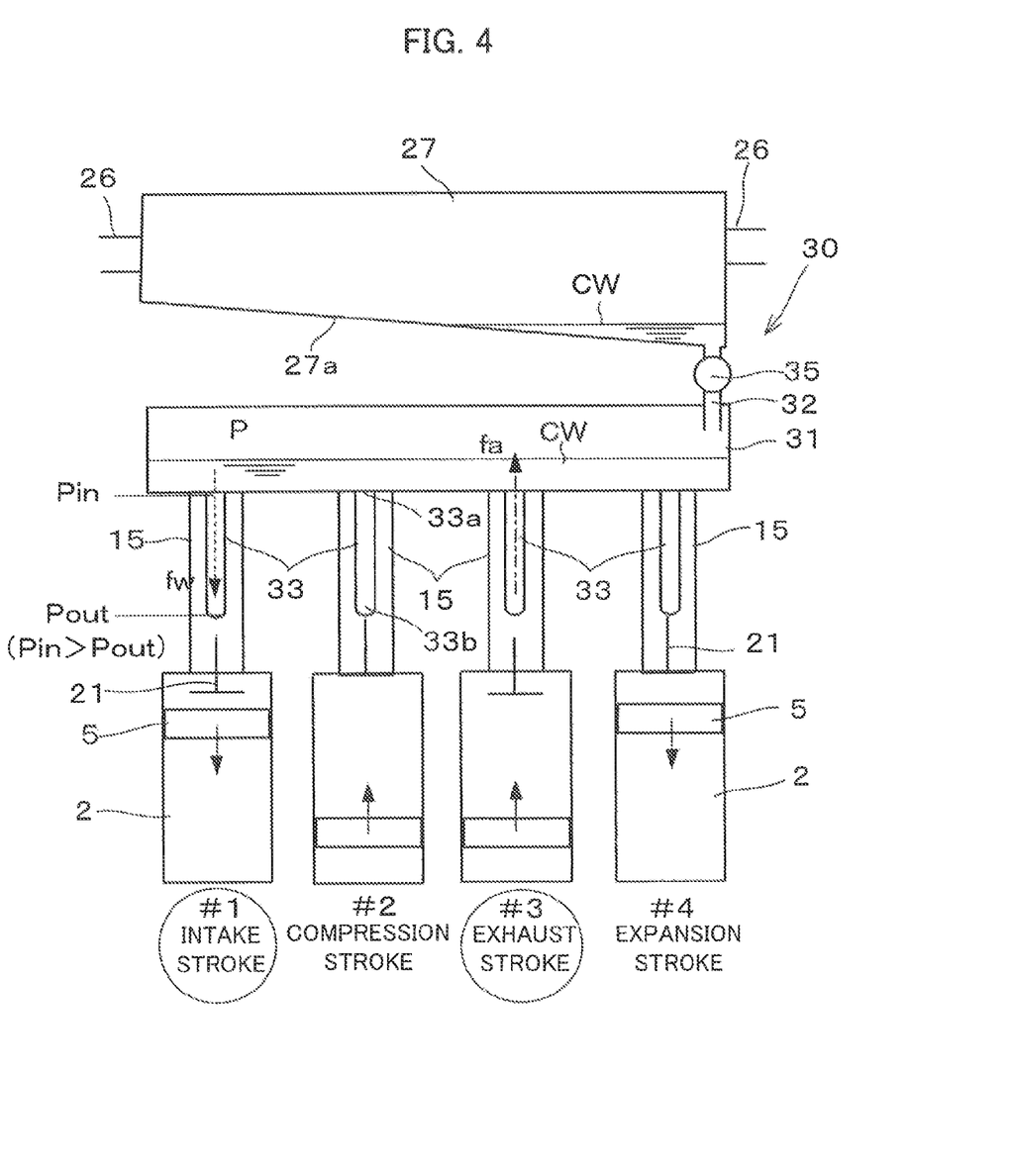
FIG. 4 is an explanatory figure for explanation of the method by which condensed water is introduced.

Introduction of the condensed water CW into the exhaust side branch conduits 15 is implemented during the valve overlap periods of the cylinders 2. For example, as shown in FIG. 4, the case may be considered of overlap of the intake stroke of the #1 cylinder 2 and the exhaust stroke of the #3 cylinder 2. In this case, as shown by the arrow sign fa, the exhaust gas pulsation generated by the exhaust gas stroke of the #3 cylinder 2 pressurizes the interior of the storage tank 31 via the corresponding condensed water introduction conduit 33. In other words, the internal pressure P of the storage tank 31 is raised because of the exhaust gas pulsation generated by the exhaust gas stroke of the #3 cylinder 2. Due to this, during the valve overlap period at the intake stroke of the #1 cylinder 2, the pressure Pout at the outlet 33b of its condensed water introduction conduit 33 is reduced below the internal pressure P of the storage tank 31, in other words is reduced below the pressure Pin at the inlet 33a of its condensed water introduction conduit 33. And, due to this pressure difference, as shown by the arrow sign fw, during the valve overlap period, some of the condensed water CW that is stored in the storage tank 31 is supplied via the corresponding condensed water introduction conduit 33 to the exhaust side branch conduit 15, and thence to the #1 cylinder 2. It should be understood that, since the exhaust valves 21 and the intake valves 20 of the #2 cylinder 2 and of the #4 cylinder 2 are all closed, accordingly the inlet pressures Pin and the outlet pressures Pout of the condensed water introduction conduits 33 that are provided to these cylinders 2 are in equilibrium, so that no condensed water CW is supplied to those cylinders 2. Since with this engine 1 it is possible to supply the condensed water CW into the cylinders 2 in this manner, accordingly no pump is employed, and thus it is possible to avoid corrosion of such a pump.

As inferred from the above explanation, by changing the valve opening characteristics of the intake valves 20 or the exhaust valves 21, it is possible to change the amount of condensed water to be supplied to the cylinder 2. For example, if the valve opening timing of the intake valves 20 is retarded, or the valve closing timing of the exhaust valves 21 is retarded, depending on the retardation, the negative pressure occurring in an inside area from the corresponding exhaust side branch conduit 15 to the corresponding cylinder 2 increases. Due to this, the amount of condensed water led to the exhaust side branch conduit 15 that is taken into the cylinder 2 increases.

The engine 1 changes to the amount of condensed water which is taken into the cylinder 2 depending on the wall temperature of the cylinders 2, to promote the process for the condensed water. As shown in FIG. 1, this engine 1 is provided with an engine control unit (ECU) 40 that is built as a computer that controls various sections of the engine 1. The ECU 40 performs control of the main operations of the engine 1, such as control of the fuel injection valves 6 and control of the variable valve gear 23 and so on. In this embodiment, the ECU 40 is also used for processing related to the condensed water. Signals from a large number of sensors that detect various physical quantities for ascertaining the operational state of the engine 1 are inputted to the ECU 40. For example, to cite sensors that nave some relevance to the present invention: a crank angle sensor 41 that outputs a signal corresponding to the crank angle of the engine 1, an accelerator opening amount sensor 42 that outputs a signal corresponding to the amount by which an accelerator pedal 37 is stepped upon (i.e. an accelerator opening amount), an exhaust gas temperature sensor 43 that outputs a signal corresponding to the temperature of the exhaust gas flowing in the exhaust passage 11, and so on, are provided to the engine 1, and the output signals of these sensors are inputted to the ECU 40.

Figure 5:
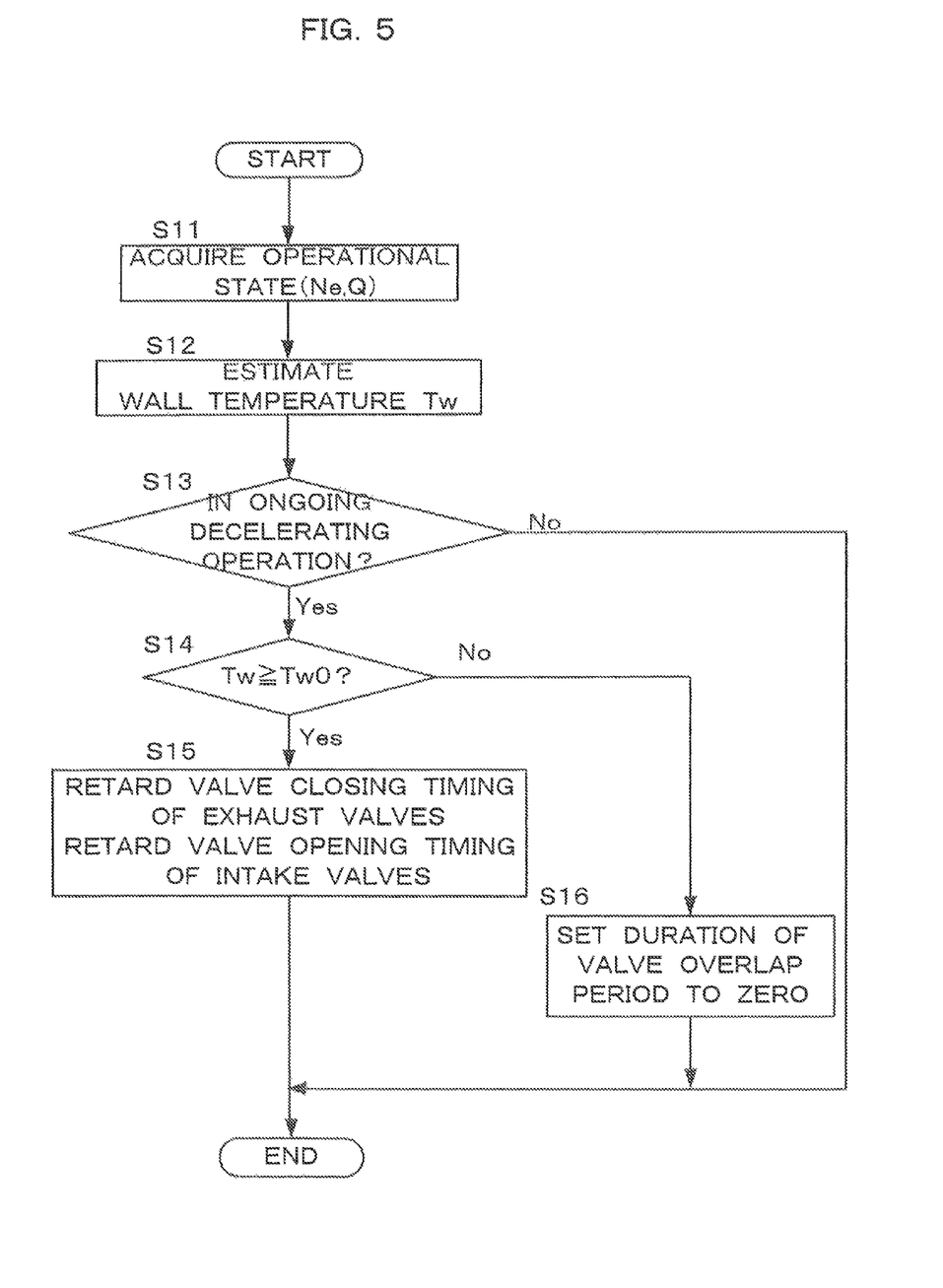
FIG. 5 is a flow chart showing an example of a control routine according to a first embodiment.

The program of the control routine of FIG. 5 is stored in the ECO 40, and is read out in a timely manner and repeatedly implemented at predetermined calculation intervals. First, in step S11, the ECO 40 acquires the operational state of the engine 1. Here, the ECU 40 acquires the engine rotational speed Ne and the fuel injection amount Q of the engine 1. The engine rotational speed is calculated on the basis of the output signal of the crank angle sensor 41, and the fuel injection amount Q is calculated on the basis of the output signal of the accelerator opening amount sensor 42.

Figure 6:
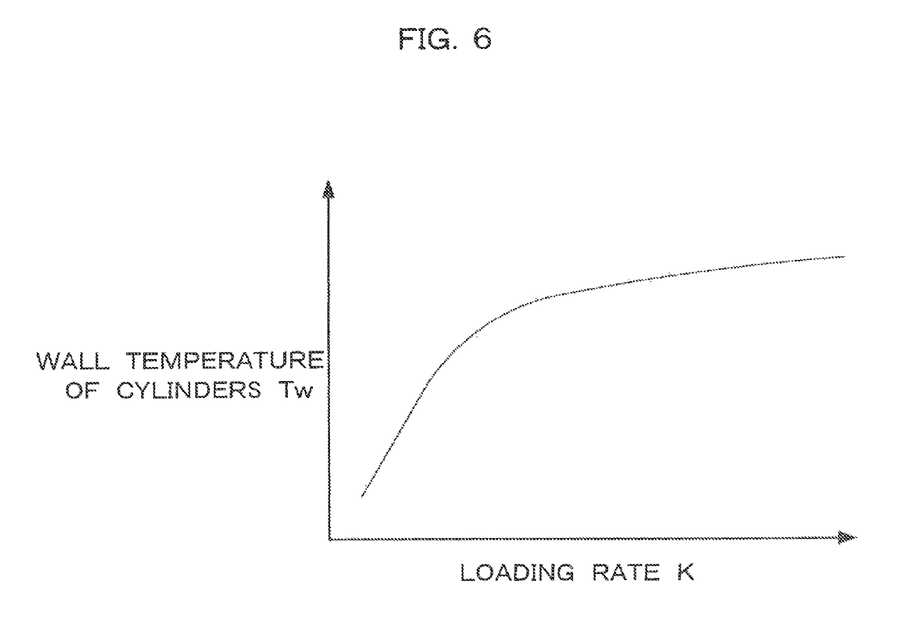
FIG. 6 is a diagram schematically showing a map structure for estimating wall temperature of the cylinders.

In step S12, the ECU 40 estimates the wall temperature Tw of the cylinders 2. The wall temperature Tw is estimated based on a loading rate K which is calculated based on the fuel injection amount Q calculated in step S11. Concretely, the ECU 40 refers to a calculation, map having a structure shown in FIG. 6, and specifies the wall temperature Tw corresponding to the current loading rate K to estimate the wall temperature Tw. Additionally, it is possible to estimate the wall temperature Tw with other methods than the above mentioned method. For example, by detecting the exhaust temperature of the engine 1, the wall temperature Tw can be estimated based on the exhaust temperature detected. Alternatively, by detecting the pressure (the cylinder pressure) of the cylinder 2, the wall temperature Tw can be estimated based on the cylinder pressure detected. Any one of the fuel injection amount, the loading rate, the exhaust temperature, and the cylinder pressure is a physical amount correlating to the wall temperature Tw. In step S13, the ECU 40 determines whether or not the engine 1 is in a decelerating operation. Here, the ECU 40 refers to the output signal of the accelerator opening amount sensor 42, and determines that the engine 1 is in the decelerating operation when the accelerator opening amount is zero, that is, the driver's foot is away from the accelerator pedal 37. This criterion may be changed as appropriate. For example, the ECU 40 may calculate a change amount of engine rotational speed base on the output signal of the crank angle sensor 41, and may determine that the engine 1 is in the decelerating operation when the change amount is equal to or less than a predetermined criterion value. When, the engine 1 is in the decelerating operation, the ECU 40 goes to step S14, and when the engine 1 is not in the decelerating operation, the ECU 40 skips the following processes and ends the routine of this time.

In step S14, the ECU 40 determines whether or not the wall temperature Tw which has been estimated in step 312 is equal to or higher than a predetermined temperature Tw0. The predetermined temperature Tw0 may be equal to or higher than a lower limit value of the wall temperature Tw at which the condensed water evaporates in the cylinder 2. Accordingly, when the condensed water is led into the cylinder 2 in a situation where the wall temperature Tw is equal to or higher than the predetermined temperature Tw0, the condensed water evaporates in the cylinder 2. When the wall temperature Tw is equal to or higher than the predetermined temperature Tw0, the ECU 40 goes to step S15. When the wall temperature Tw is less than the predetermined temperature Tw0, the ECU 40 goes to step S16.

In step S15, the ECU 40 controls each of the intake-side variable valve mechanism 23A and the exhaust-side variable valve mechanism 23B so that the valve closing timing of the exhaust valves 21 are retarded and also the valve opening timing of the intake valves 20 are retarded. After that, the ECU 40 ends the routine of this time. The retard amount of the valve closing timing of the exhaust valves 21 and the retard amount of the valve opening timing of the intake valves 20 may be set as appropriate. The bigger are the retard amounts of them, the bigger the negative pressure occurring inside the corresponding cylinder 2 becomes. Therefore, the retard amount can be set to a mechanical maximum value of each of the variable valve mechanisms 23A and 23B.

In step S16, the ECU 40 controls the exhaust-side variable valve mechanism 23B so that the duration of the valve overlap period becomes zero by advancing the valve closing timing of the exhaust, valves 21. Then, the ECU 40 ends the routine of this time.

According to the control routine shown in FIG. 5, when the wall temperature Tw of the cylinders 2 is equal to or higher than the predetermined temperature Tw0 while the engine 1 is in the decelerating operation, since the valve closing timing of the exhaust valves 21 and the valve opening timing of the intake valves 20 are retarded respectively, the negative pressure occurring inside the area from, the corresponding exhaust side branch conduit 15 to the corresponding cylinder 2 increases. Thereby, more condensed water can be taken into the cylinder 2 than condensed water of a case where the mentioned valve timings are not retarded, and thereby, it is possible to process much amount of condensed water in the ongoing decelerating operation. Accordingly, since the process of the condensed water is promoted in the ongoing decelerating operation, it is possible to decrease the amount of condensed water remaining in the storage tank 31 at the moment when the engine 1 stops following after the decelerating operation. Therefore, it is possible to avoid the corrosion of the storage tank 31.

On the other hand, when the wall temperature Tw of the cylinders 2 is less than the predetermined temperature Tw0 while the engine 1 is in the decelerating operation, since the duration of the valve overlap period becomes zero, it is prohibited to take the condensed water into the cylinder 2. Thereby, it is possible to decrease the amount of condensed water remaining in the cylinder 2. Due to this, it is possible to suppress the corrosion of the inside of the cylinder 2. The ECU 40 functions as the valve timing control device of the present invention by implementing the control routine shown in FIG. 5.

Second Embodiment

Next, a second embodiment will be described in reference to FIG. 7. The second embodiment is the same as the first embodiment except control to be implemented in the ongoing decelerating operation. Hereinafter, with respect to shared matters with the first embodiment, explanations of them will be omitted or simplified. With respect to the physical configuration of the engine 1 in the second embodiment, FIG. 1 to FIG. 3 should be referred.

Figure 7:
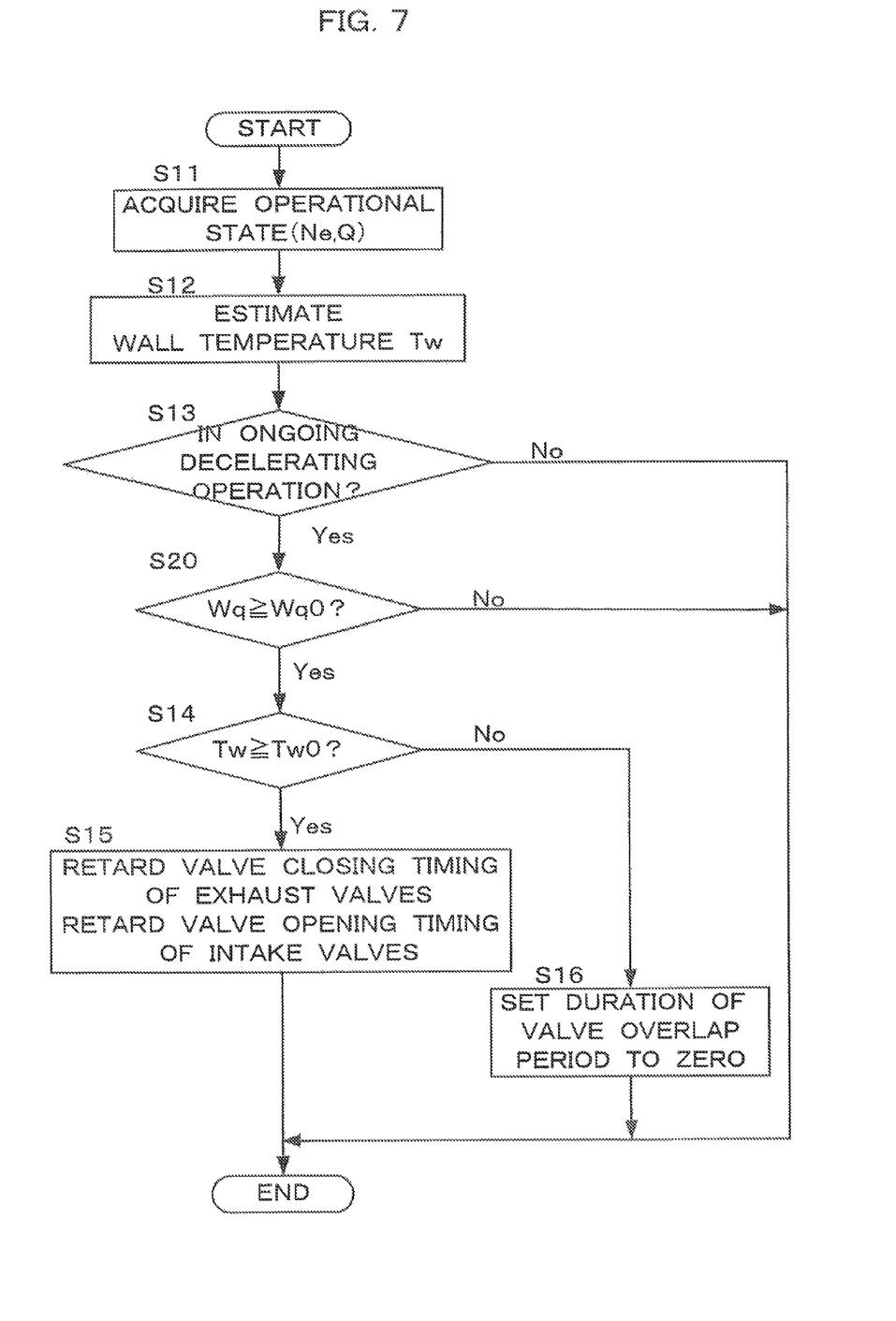
FIG. 7 is a flow chart showing an example of a control routine according to a second embodiment.

A computer program of the control routine shown in FIG. 7 is held in the ECU 40, and is read out in a timely manner and repeatedly Implemented at predetermined calculation intervals. As apparent in FIG. 7, the control routine according to the second embodiment corresponds to a control routine where step S20 is added to the control routine shown in FIG. 5. The processes other than step S20 are the same as the processes in the first embodiment. Due to this, duplicated explanations will be omitted.

In step S20, the ECU 40 determined whether or not the pondage Wq of condensed water stored in the storage tank 31 is equal to or more than a predetermined pondage Wq0. The pondage Wp is measured directly by a detecting device (not illustrated) such as a level sensor provided to the storage tank 31. However, the pondage Wq can be estimated based on the physical amounts of the reflux volume of the EGR gas, the exhaust gas temperature, the coolant water temperature of the engine 1, the ambient temperature and the like, the physical amounts correlating to the generation amount of condensed water The predetermined pondage Wp0 is set as a limit value of the condensed water in the storage tank 31, which is expected to be used up by a normal process of condensed water to be implemented during the valve overlap period, in a situation where the process of the condensed water is not promoted by the above mentioned control of the valve timing. Accordingly, when the pondage Wq of the condensed water stored in the storage tank 31 is equal to or more than the predetermined pondage Wq0, there is a high possibility that the condensed water in the storage tank 31 is not used fully by the normal process of condensed water and the condensed water remains in the storage tank 31 at time of engine stop.

Then, the ECU 40 implements, when the pondage Wq is equal to or more than the predetermined pondage Wq0, the controls of steps S14 to S16 to promote the process of the condensed water. On the other hand, when the pondage Wq is less than, the predetermined pondage Wq0, the ECU 40 skips the following processes and ends the routine of this time. In this way, in the second embodiment, the valve timing is changed only when it is necessary to promote the process of the condensed water. Due to this, while the negative effects of the change of the valve timing, such as deterioration of output of the engine 1 and deterioration of fuel cost, are reduced as much as possible, enabled is the process of the condensed water so that the condensed water does not remain in the storage tank 31 at time of engine stop.

Third Embodiment

Next, a third embodiment will be described in reference to FIG. 8. The third embodiment is the same as the first embodiment except control to be implemented in the ongoing decelerating operation. Hereinafter, with respect to shared matters with the first embodiment, explanations of them will be omitted or simplified. With respect to the physical configuration of the engine 1 in the third embodiment. FIG. 1 to FIG. 3 should be referred.

Figure 8:
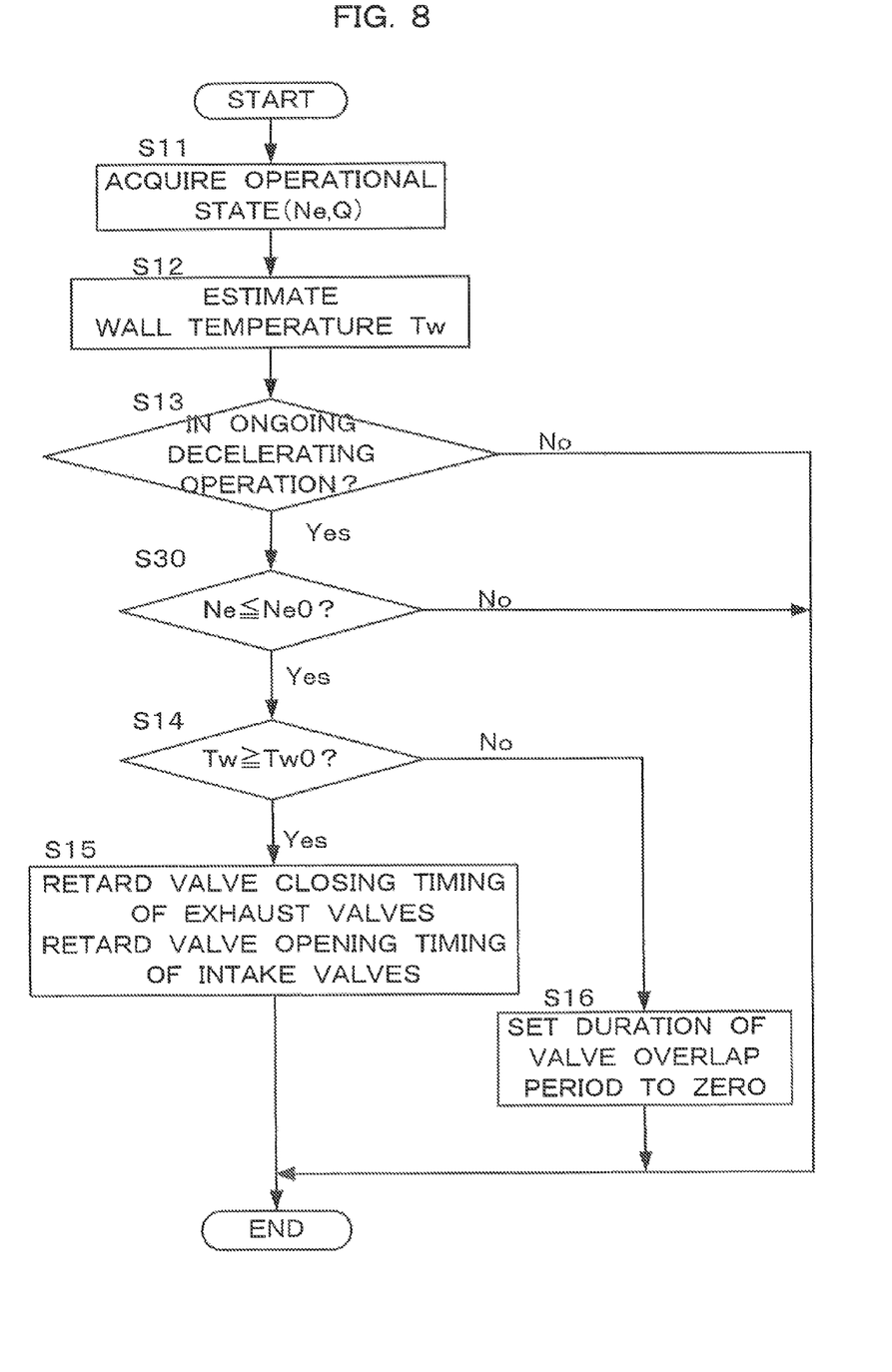
FIG. 8 is a flow chart showing an example of a control routine according to a third embodiment.

A computer program of the control routine shown in FIG. 8 is held in the ECU 40, and is read out in a timely manner and repeatedly implemented at predetermined calculation intervals. As apparent in FIG. 8, the control routine according to the third embodiment corresponds to a control routine where step S30 is added to the control, routine shown in FIG. 5. The processes other than step S30 are the same as the processes in the first embodiment. Due to this, duplicated explanations will be omitted.

In step S30, the ECU 40 determines whether or not the engine rotational speed (the rpm) Ne of the engine 1 is equal to or lower than a predetermined rotational speed Ne0. The predetermined rotational speed Ne0 is set for discriminating between a deceleration for reaching stop of the engine 1 and a deceleration not directly related to stop of the engine 1. For example, the value of the predetermined rotational speed Ne0 may be set so that a deceleration at time of high speed of the engine 1 is excluded. Since the predetermined rotational speed Ne0 is set according to such a viewpoint, when the engine rotational speed Ne is equal to or lower than the predetermined rotational speed Ne0, there is a high possibility that the engine 1 is going to stop.

Then, when the engine rotational speed Ne is equal to or lower than the predetermined rotational speed Ne0, the ECU 40 implements the controls of step S14 to step S16 to promote the process of the condensed water. On the other hand, when the engine rotational speed Ne is less than the predetermined rotational speed Ne0, the ECU 40 skips the following processes and ends the routine of this time. In this way, in the third embodiment, a frequency of change of the valve timing is lowered as compared to a case where the process of condensed water is promoted in all of the ongoing decelerating operations. Thereby, while the negative effects of the change of the valve timing, such as deterioration of output of the engine 1 and deterioration of fuel cost, are reduced as much as possible, enabled is the process of the condensed water so that the condensed water does not remain in the storage tank 31 at time of engine stop.

The present invention is not limited to each, above embodiment, and can be implemented in various kinds of embodiments within the substance of the present invention. In each above embodiment, implemented were both of the retard of the valve closing timing of the exhaust valves 21 and the retard of the valve opening timing of the intake valves 20. However, only the retard of the valve closing timing of the exhaust valves 21 may be implemented. Even in this case, also, it is possible to make the negative pressure occurring inside the cylinder 2 bigger as compared to a case where the valve closing timing of the exhaust valves 21 is not retarded. Therefore, it is possible to accomplish the object of the present invention. When the exhaust-side variable valve mechanism 23B is configured to implement so-called twice opening operation where after closed the exhaust valve 21 is opened again, in addition to the retard of the valve closing timing of the exhaust valve 21 in step S15 of FIG. 5 or 7, the twice opening operation can be implemented. By implementing such a twice opening operation, it is possible to further promote to lead the condensed water into the cylinder 2.

While the engines 1 according to the embodiments described above was built as a diesel engine, the engine to which the present invention is applied is not limited to being a diesel engine. Accordingly, it would also be possible to implement the present invention as a spark ignition type engine. Furthermore, while the engines 1 were four cylinder in-line type engines, the arrangement of the cylinders and the number of the cylinders are not particularly limited. For example, provided that a plurality of cylinders is provided, the present invention could be implemented as a V-type engine or as a horizontally opposed type engine. And while, in the embodiments described above, the outlets of the condensed water introduction conduits 33 were provided in the branch conduits 16*a* that were included in the exhaust side branch conduits 15, it would also be possible to change these outlets to the exhaust ports 17 that are included in the exhaust side branch conduits 15.

The invention claimed is:

1. A multi-cylinder internal combustion engine having: a plurality of cylinders; and an EGR device including an EGR cooler, wherein
the multi-cylinder internal combustion engine comprising:
a plurality of exhaust side branch conduits, each of the plurality of exhaust side branch conduits being provided to each of the plurality of cylinders;
a condensed water storage portion where condensed water generated by the EGR cooler is stored;
a plurality of condensed water introduction conduits, each of the plurality of condensed water introduction conduits being provided for each exhaust side branch conduit, and is communicated with a corresponding exhaust side branch conduit and with the condensed water storage portion,
an exhaust-side variable valve mechanism being allowed to change valve timing of each exhaust valve; and
a computer executing a computer program to function as a valve timing control device being configured to control the exhaust-side variable valve mechanism so that a valve closing timing of the exhaust valve is retarded when wall temperature of the cylinders is equal to or higher than a predetermined temperature in an ongoing decelerating operation.

2. The multi-cylinder internal combustion engine according to claim 1, wherein
the valve timing control device is configured to control the exhaust-side variable valve mechanism so that the valve closing timing of the exhaust valve is retarded when engine rotational speed is equal to or lower than a predetermined rotational speed and also the wall temperature of the cylinders is equal to or higher than the predetermined temperature, in the ongoing decelerating operation.

3. The multi-cylinder internal combustion engine according to claim 1, wherein
the valve timing control device is configured to control the exhaust-side variable valve mechanism so that the valve closing timing of the exhaust valve is retarded when a pondage of condensed water stored in the condensed water storage portion is equal to or more than a predetermined pondage and also the wall temperature of the cylinders is equal to or higher than the predetermined temperature, in the ongoing decelerating operation.

4. The multi-cylinder internal combustion engine according to claim 1, further comprising an intake-side variable valve mechanism being allowed to change valve timing of each intake valve wherein
the valve timing control device is configured to control each of the exhaust-side variable valve mechanism and the intake-side variable valve mechanism so that the valve closing timing of the exhaust valve is retarded and also a valve opening timing of the intake valve is retarded, when the wall temperature is equal to or higher than the predetermined temperature in the ongoing decelerating operation.

5. The multi-cylinder internal combustion engine according to claim 4, wherein
the valve timing control device is configured to control each of the exhaust-side variable valve mechanism and the intake-side variable valve mechanism so that the valve closing timing of the exhaust valve is retarded and also the valve opening timing of the intake valve is retarded, when engine rotational speed is equal to or lower than a predetermined rotational speed and also the wall temperature of the cylinders is equal to or higher than the predetermined temperature, in the ongoing decelerating operation.

6. The multi-cylinder internal combustion engine according to claim 4, wherein
the valve timing control device is configured to control each of the exhaust-side variable valve mechanism and the intake-side variable valve mechanism so that the valve closing timing of the exhaust valve is retarded and also the valve opening timing of the intake valve is retarded, when a pondage of condensed water stored in the condensed water storage portion is equal to or more than a predetermined pondage and also the wall temperature of the cylinders is equal to or higher than the predetermined temperature, in the ongoing decelerating operation.

7. The multi-cylinder internal combustion engine according to claim 1, wherein
the valve timing control device is configured to control the exhaust-side variable valve mechanism so that duration of a valve overlap period where valve open periods of the exhaust valve and the intake valve overlap with each other becomes zero, when the wall temperature is less than the predetermined temperature in the ongoing decelerating operation.

* * * * *